(12) United States Patent
Chiang (10) Patent No.: US 8,587,675 B2
(45) Date of Patent: Nov. 19, 2013

(54) ACTUATOR AND ANTI-VIBRATION CAMERA MODULE USING SAME

(75) Inventor: Shun-Fan Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 779 days.

(21) Appl. No.: 12/713,338

(22) Filed: Feb. 26, 2010

(65) Prior Publication Data

US 2011/0001836 A1   Jan. 6, 2011

(30) Foreign Application Priority Data

Jul. 6, 2009   (CN) .......................... 2009 1 0304047

(51) Int. Cl.
*H04N 5/228* (2006.01)
*G02B 27/64* (2006.01)
*G02B 6/26* (2006.01)
*G02B 6/42* (2006.01)

(52) U.S. Cl.
USPC ................ 348/208.7; 348/208.4; 348/208.99; 359/554; 385/52

(58) Field of Classification Search
USPC .... 348/208.01–208.99; 359/554–557; 385/52
See application file for complete search history.

(56) References Cited

U.S. PATENT DOCUMENTS

| | | | |
|---|---|---|---|
| 7,502,554 B2* | 3/2009 | Enomoto ......................... | 396/55 |
| 7,652,712 B2* | 1/2010 | Watanabe et al. .............. | 348/340 |
| 7,782,559 B2* | 8/2010 | Huang et al. ................... | 359/824 |
| 7,952,613 B2* | 5/2011 | Sekino et al. ............... | 348/208.7 |
| 7,983,551 B2* | 7/2011 | Chang ........................... | 396/133 |
| 2006/0034599 A1* | 2/2006 | Osaka ........................... | 396/144 |
| 2006/0092285 A1* | 5/2006 | Shin ........................... | 348/208.7 |
| 2007/0146883 A1* | 6/2007 | Akada et al. ................... | 359/554 |
| 2008/0074504 A1* | 3/2008 | Sekino ..................... | 348/208.99 |
| 2008/0192124 A1* | 8/2008 | Nagasaki ................. | 348/208.11 |
| 2009/0002825 A1* | 1/2009 | Morita et al. .................. | 359/554 |
| 2009/0091829 A1* | 4/2009 | Nagai et al. ................... | 359/557 |
| 2010/0080545 A1* | 4/2010 | Fan et al. ......................... | 396/55 |
| 2011/0096178 A1* | 4/2011 | Ryu et al. ................... | 348/208.2 |
| 2011/0181740 A1* | 7/2011 | Watanabe et al. .......... | 348/208.2 |

FOREIGN PATENT DOCUMENTS

WO    WO 2009139543 A1 * 11/2009

* cited by examiner

*Primary Examiner* — Chia-Wei A Chen
(74) *Attorney, Agent, or Firm* — Altis Law Group, Inc.

(57) ABSTRACT

An actuator includes a stationary member defining a first receiving room and a center axis, a moveable member received in the first receiving room and being apart from the stationary member, a driving member, and a resilient spring assembly. The moveable member is coaxial with the stationary member. The driving member comprises a first magnetic assembly fixed to the stationary member and a second magnetic assembly fixed to the moveable member. The first magnetic assembly faces the second magnetic assembly. The driving member is configured for driving the moveable member to move along a first axis and a second axis perpendicular to the first axis. The first axis and the second axis are perpendicular to the central axis. The spring assembly is positioned between the stationary member and the moveable member and connects the moveable member to the stationary member. The spring assembly elastically deforms when the moveable member moves.

20 Claims, 8 Drawing Sheets

ACTUATOR AND ANTI-VIBRATION CAMERA MODULE USING SAME

BACKGROUND

1. Technical Field

The present disclosure relates to imaging technologies and, particularly, to an actuator and an anti-vibration camera module having such actuator.

2. Description of Related Art

With ongoing developments in imaging and multimedia technology, camera modules have become widely used in many kinds of consumer electronic devices, such as cellular phones, laptops, digital cameras, personal digital assistants (PDAs), etc. Generally, a camera module includes a lens module, an image sensor such as a charge-coupled device (CCD) or a complementary metal oxide semiconductor (COMS). Light reflected by an object passes through the lens module to impinge on the image sensor. The image sensor is configured for capturing an image of the object by receiving the light.

However, image quality of these electronic devices is negatively affected when subjected to vibration from external forces. Such vibration causes deflection of the optical axis of the camera module, resulting in a blurred image being captured.

Therefore, what is needed is an actuator and an anti-vibration camera module using the same which can overcome the above-mentioned problems.

BRIEF DESCRIPTION OF THE DRAWINGS

Many aspects of the present actuator and the present anti-vibration camera module can be better understood with reference to the following drawings. The components in the drawings are not necessarily to scale, the emphasis instead being placed upon clearly illustrating the principles of the actuator and the anti-vibration camera module. Moreover, in the drawings, like reference numerals designate corresponding parts throughout the several views.

DETAILED DESCRIPTION

Figure 1:
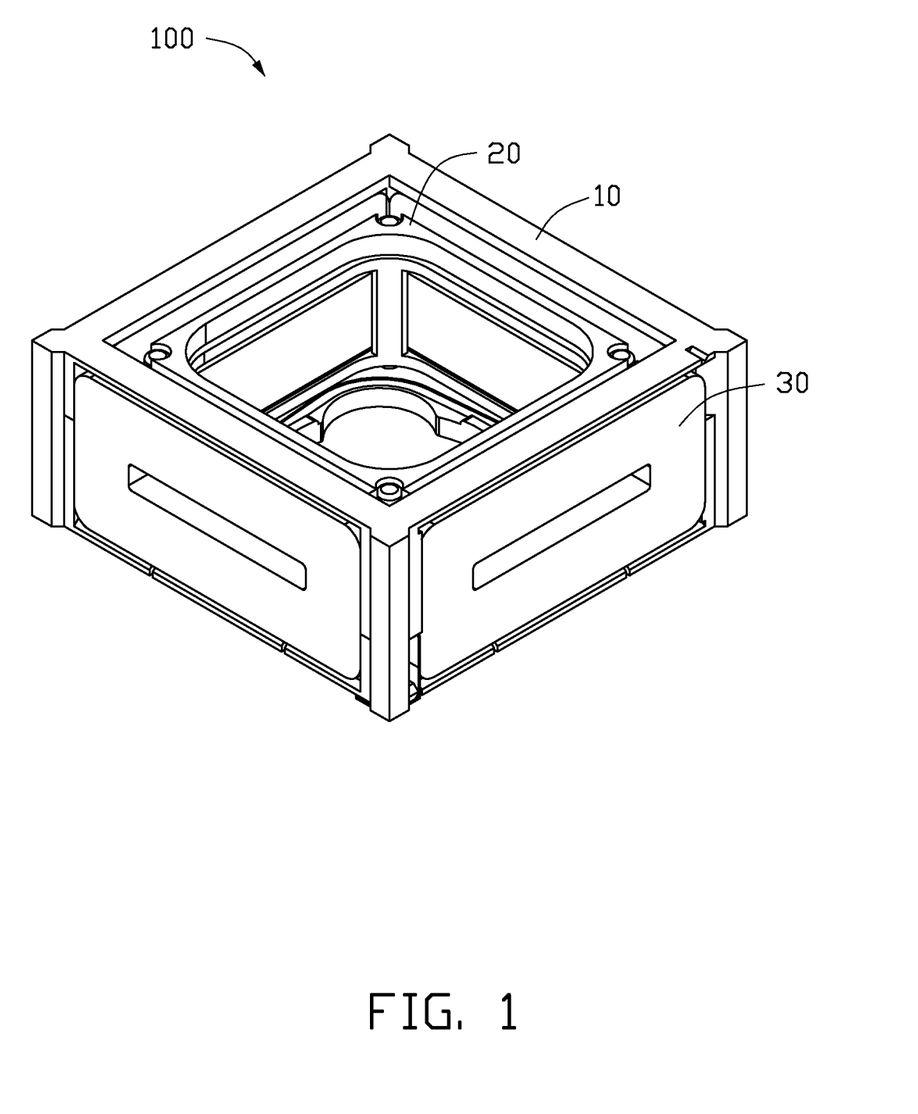
FIG. 1 is a schematic, isometric view of an actuator including a moveable member and a resilient spring assembly, according to a first exemplary embodiment.
Figure 2:
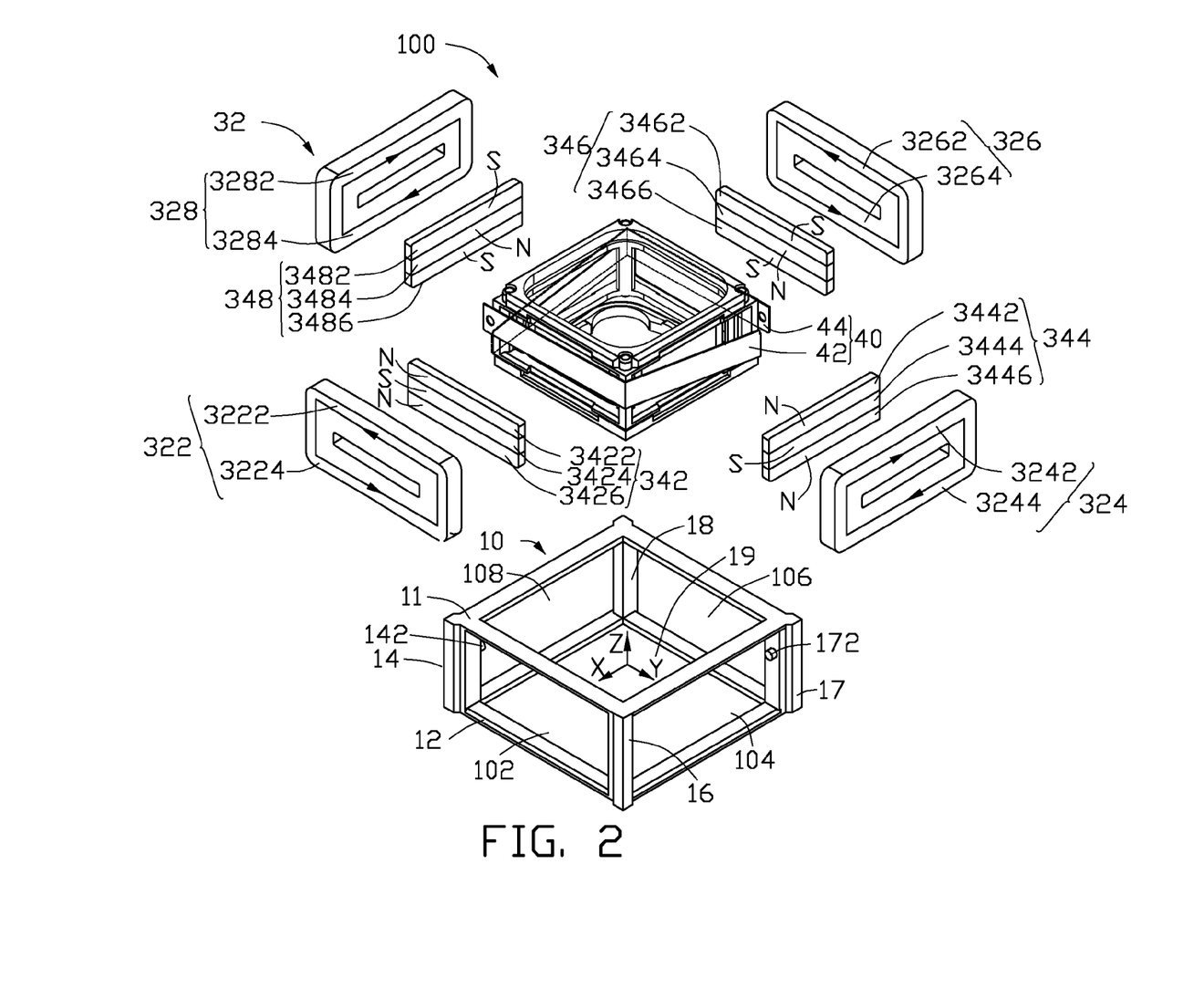
FIG. 2 is an exploded view of the actuator of FIG. 1.

Referring to FIGS. 1 and 2, an actuator 100, according to a first exemplary embodiment, includes a stationary member 10, a moveable member 20, a driving member 30, and a resilient spring assembly 40.

The stationary member 10 is an approximately cuboid frame and includes an upper frame 11, a lower frame 12, a first post 14, a second post 16, a third post 17, and a fourth post 18. The upper frame 11 and the lower frame 12 are positioned at opposite sides of the stationary member 10. The four posts 14, 16, 17 and 18 connect the upper frame 11 to the lower frame 12 at respective four corners of the upper frame 11 and the lower frame 12.

A central axis (Z axis) and a first receiving room 19 are defined in the stationary member 10. A first receiving hole 102, a second receiving hole 104, a third receiving hole 106, and a fourth receiving hole 108 are respectively defined in four sides of the stationary member 10. The first receiving hole 102 and the third receiving hole 106 are at opposite sides of the stationary member 10. The second receiving hole 104 and the fourth receiving hole 108 are at the other opposite sides of the stationary member 10. The four receiving holes 102, 104, 106 and 108 are in communication with the first receiving room 19.

A first protrusion 142 is formed on a side of the first post 14 in the fourth receiving hole 108. A second protrusion 172 is formed on a side of the third post 17 in the second receiving hole 104. In this embodiment, the two protrusions 142 and 172 are nearer to the upper frame 11 than to the lower frame 12. The two protrusions 142 and 172 are cylinder.

Figure 3:
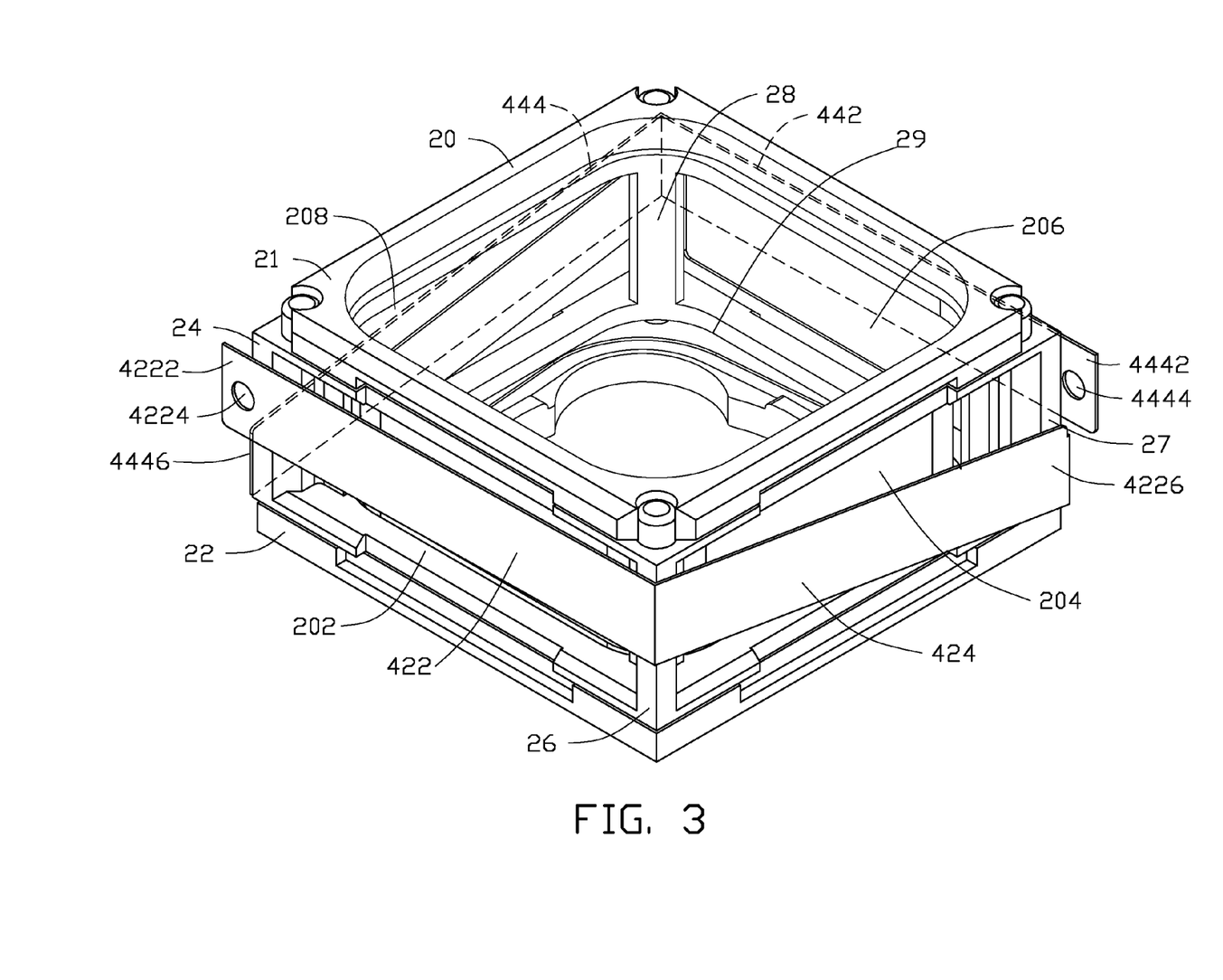
FIG. 3 is an enlarged view of the moveable member and the spring assembly of FIG. 2.

Referring to FIG. 3 together with FIG. 2, the moveable member 20 is an approximately cuboid frame and received in the first receiving room 19. The moveable member 20 includes a first frame 21, a second frame 22, a first pole 24, a second pole 26, a third pole 27 and a fourth pole 28. The first frame 21 and the second frame 22 are positioned at opposite sides of the moveable member 20. The four poles 24, 26, 27 and 28 connect the first frame 21 to the second frame 22 at the respective four corners of the first frame 21 and the second frame 22.

A second receiving hole 29 is defined in the moveable member 20 and configured for receiving an image sensor (not shown) or a lens module (not shown) or both the image sensor and the lens module. A first receiving groove 202, a second receiving groove 204, a third receiving groove 206 and a fourth receiving groove 208 are respectively defined on the four sides of the moveable member 20. The four receiving grooves 202, 204, 206 and 208 align with the four receiving holes 102, 104, 106 and 108, respectively.

The driving member 30 is configured for driving the moveable member 20 to move along an X axis or a Y axis perpendicular to the X axis. The X axis and the Y axis are perpendicular to the Z axis. The driving member 30 includes a first magnetic assembly 32 and a second magnetic assembly 34. The first magnetic assembly 32 is fixed to the stationary member 10. The second magnetic assembly 34 is fixed to the moveable member 20 facing the first magnetic assembly 32.

The first magnetic assembly 32 includes a first coil 322, a second coil 324, a third coil 326 and a fourth coil 328. The four coils 322, 324, 326 and 328 are rectangular. The first coil 322 is received in the first receiving hole 102 and includes a first upper side 3222 and a first lower side 3224 opposite to the first upper side 3222. The second coil 324 is received in the second receiving hole 104 and includes a second upper side 3242 and a second lower side 3242 opposite to the second upper side 3242. The third coil 326 is received in the third receiving hole 106 and includes a third upper side 3262 and a third lower side 3264 opposite to the third upper side 3262. The fourth coil 328 is received in the fourth receiving hole 108 and includes a fourth upper side 3282 and a fourth lower side 3284 opposite to the fourth upper side 3282. An electric current can be applied to the four coils 322, 324, 326 and 328.

The second magnetic assembly 34 includes a first magnet unit 342, a second magnet unit 344, a third magnet unit 346, and a fourth magnet 348.

The first magnet unit 342 is received in the first receiving groove 202 to face the first coil 322. The first magnet unit 342 includes a first upper magnet 3422, a first middle magnet 3424, and a first lower magnet 3426. The three magnets 3422, 3424 and 3426 are adhesively attached to each other. The magnetic north of the first upper magnet 3422 faces the first coil 322. The magnetic south of the first middle magnet 3424 faces the first coil 322. The magnetic north of the first lower magnet 3426 faces the first coil 322.

The second magnet unit 344 is received in the second receiving groove 204 to face the second coil 324. The second magnet unit 344 includes a second upper magnet 3442, a second middle magnet 3444, and a second lower magnet 3446. The three magnets 3442, 3444 and 3446 are adhesively attached to each other. The third magnet unit 346 is received in the third receiving groove 206 to face the third coil 326. The third magnet unit 346 includes a third upper magnet 3462, a third middle magnet 3464, and a third lower magnet 3466. The three magnets 3462, 3464 and 3466 are adhesively attached to each other. The fourth magnet unit 348 is received in the fourth receiving groove 208 to face the fourth coil 328. The fourth magnet unit 348 includes a fourth upper magnet 3482, a fourth middle magnet 3484, and a fourth lower magnet 3486. The fourth magnets 3482, 3484, and 3486 are adhesively attached to each other. The magnetic pole distribution of the second magnet unit 344, the third magnet unit 346, and the fourth magnet unit 348 are the same as the first magnet unit 342.

The spring assembly 40 is positioned between the stationary member 10 and the moveable member 20. The spring assembly 40 includes a first elastic member 42 and a second elastic member 44.

The first elastic member 42 includes a first arm 422 and a second arm 424 connected to the first arm 422. An included angle between the first arm 422 and the second arm 424 is an obtuse angle. A first through hole 4224 is defined in a distal end 4222 of the first elastic member 42 for fixedly receiving the first protrusion 142.

The second elastic member 44 includes a third arm 442 and a fourth arm 444 connected to the third arm 442. An included angle between the third arm 442 and the fourth arm 444 is an obtuse angle. A second through hole 4444 is defined in a distal end 4442 of the second elastic member 44 for fixedly receiving the second protrusion 172.

The first protrusion 142 extends through the first through hole 4224. The distal end 4222 of the first elastic member 42 is fixed to the first post 14 and a distal end 4226 of the first elastic member 42 is fixed to the third pole 27. The second protrusion 172 extends through the second through hole 4444. The distal end 4442 of the second elastic member 44 is fixed to the third post 17 and a distal end 4446 of the second elastic member 44 is fixed to the first pole 24. Thereby, the spring assembly 40 connects the moveable member 20 to the stationary member 10.

Figure 4:
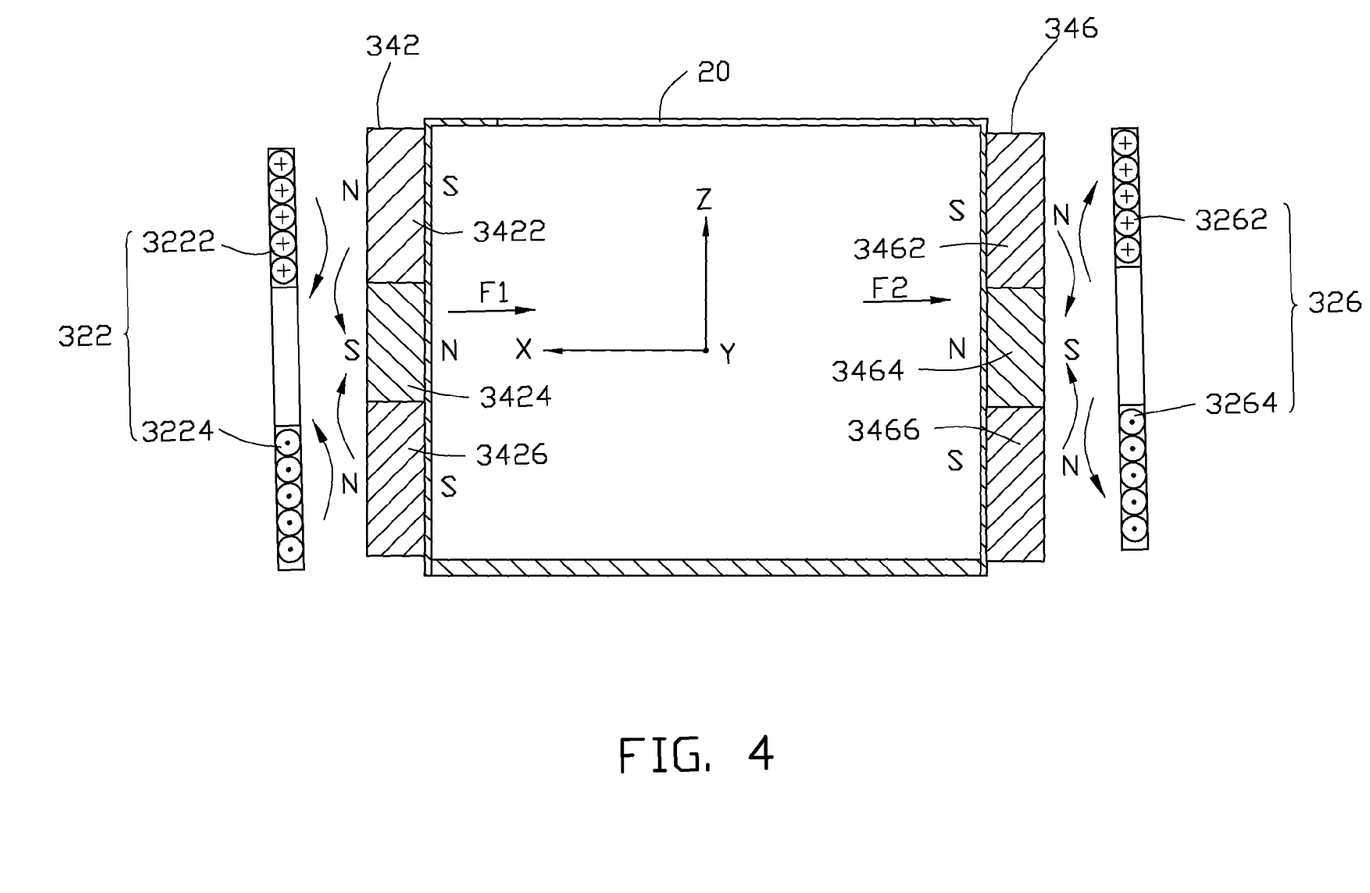
FIG. 4 is a schematic view of a working principle of the actuator of FIG. 1, showing movement of the moveable member along an X axis.

Referring to FIG. 4 and together with FIG. 2, when in use, an electrical current is applied to the first coil 322 and the third coil 326. Directions of the electric current of the first coil 322 and the third coil 326 are counterclockwise shown as an arrow, viewing from an X axis. The first upper side 3222 and the first lower side 3224 produce magnetic fields. According to Ampere's rule, viewing from Y axis, the direction of a magnetic induction line generated by the first upper side 3222 is clockwise, and a direction of the magnetic induction line generated by the first lower side 3224 is counterclockwise.

The direction of the magnetic induction line between the first upper magnet 3422 and the first middle magnet 3424 is counterclockwise, and the direction of the magnetic induction line between the first middle magnet 3424 and the first lower magnet 3426 is clockwise. Therefore, a repulsion force $F_1$ is produced between the first coil 322 and the first magnetic unit 342. According to the same principle as detailed above, an attractive force $F_2$ is produced between the third coil 326 and the third magnetic unit 346. As a result, the moveable member 20 has a movement along the negative direction of the X axis.

Figure 5:
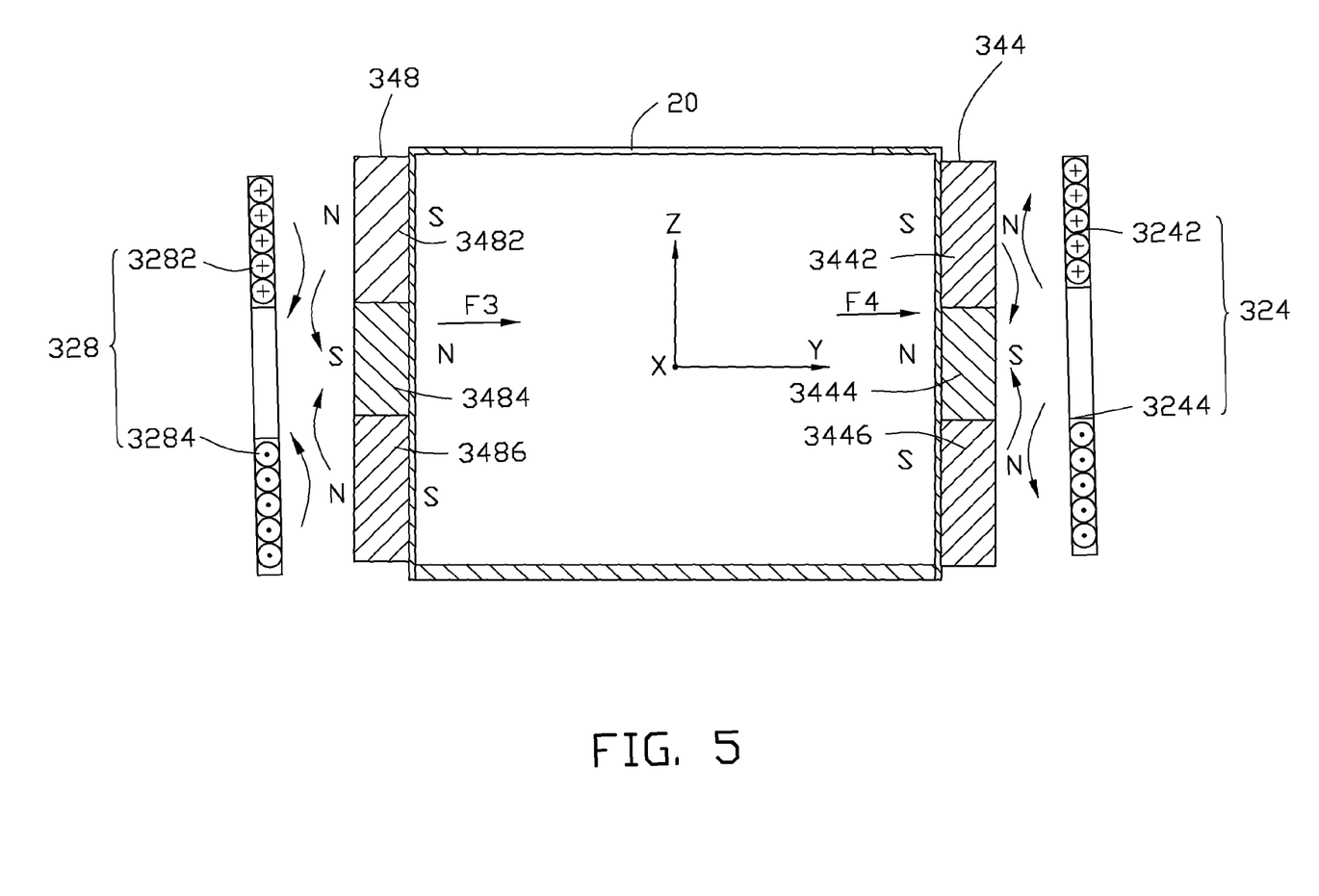
FIG. 5 is similar to FIG. 4, but showing movement of the moveable member along a Y axis.

Referring to FIG. 5 and together with FIG. 2, an electrical current is applied to the second coil 324 and the fourth coil 328. Direction of the electric current of the second coil 324 and the fourth coil 328 are clockwise shown as an arrow, viewing from a Y axis. According to the same principle as detailed above, viewing from X axis, a repulsion force $F_3$ is produced between the fourth coil 328 and the fourth magnetic unit 348. An attractive force $F_4$ is produced between the second coil 324 and the second magnetic unit 344. As a result, the moveable member 20 has a movement along the positive direction of the Y axis. Therefore, the driving member 30 moves the lens module or image sensor received in the moveable member 20 along the X axis or the Y axis to compensate for vibration. At the same time, the spring assembly 40 is deformable by a force between the moveable member 20 and the stationary member 10. After compensating for vibration, the current applied to the four coils 322, 324, 326 and 328 is canceled, the moveable member 20 is drawn back to align with the stationary member 10 by the spring assembly 40.

It is to be understand that electrical current can be applied to the four coils 322, 324, 326 and 328 at the same time, the moveable member 20 then moves along the X axis and the Y axis simultaneously.

Figure 6:
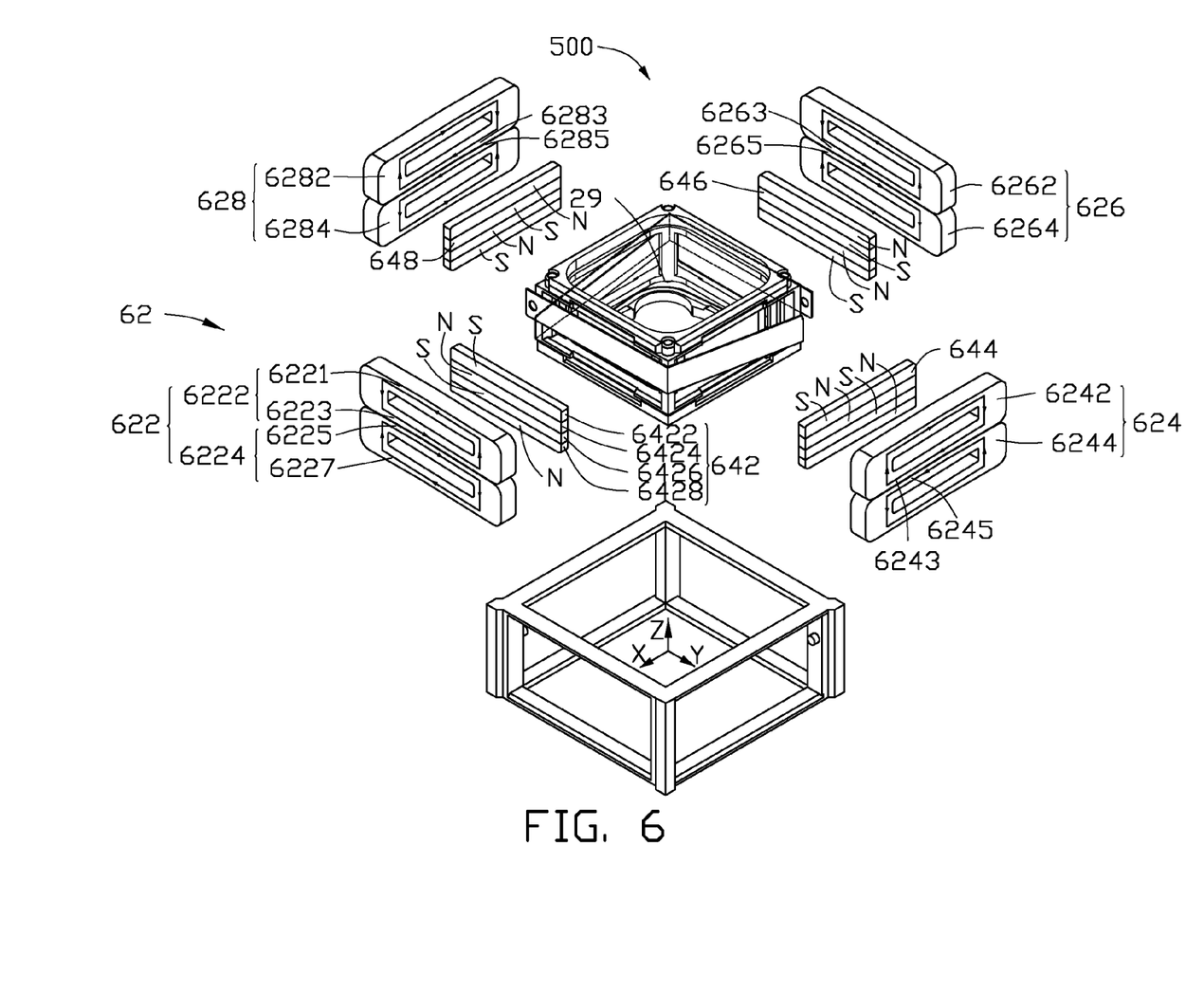
FIG. 6 is an exploded view of an actuator, according to a second exemplary embodiment.

Referring to FIG. 6, an actuator 500, according to a second exemplary embodiment is shown. The difference between the actuator 500 of this embodiment and the actuator 100 of the first embodiment are that: the first magnetic assembly 62 includes a first coil unit 622, a second coil unit 624, a third coil unit 626 and a fourth coil unit 628. The first coil unit 622 includes a first upper coil 6222 and a first lower coil 6224. The lower side 6223 of the first upper coil 6222 is positioned on the upper side 6225 of the first lower coil 6224. The second coil unit 624 includes a second upper coil 6242 and a second lower coil 6244. The lower side 6243 of the second upper coil 6242 is positioned on the upper side 6245 of the second lower coil 6244. The third coil unit 626 includes a third upper coil 6262 and a third lower coil 6264. The lower side 6263 of the third upper coil 6262 is positioned on the upper side 6265 of the third lower coil 6264. The fourth coil unit 628 includes a fourth upper coil 6282 and a fourth lower coil 6284. The lower side 6283 of the fourth upper coil 6282 is positioned on the upper side 6285 of the fourth lower coil 6284.

The second magnetic assembly 64 includes a first magnet unit 642, a second magnet unit 644, a third magnet unit 646 and a fourth magnet unit 648. The first magnet unit 642 includes a first upper magnet 6422, a first middle magnet 6424, a first sub-magnet 6426 and a first lower magnet 6428. The four magnets 6422, 6424, 6426, and 6428 are adhesively attached to each other. The magnetic south of the first upper magnet 6422 faces the first coil unit 622. The magnetic north of the first middle magnet 6424 faces the first coil unit 622. The magnetic south of the first sub-magnet 6426 faces the first coil unit 622. The magnetic north of the first lower magnet 6428 faces the first coil unit 622. The structure and the magnetic pole distribution of the second magnet unit 644, the third magnet unit 646, and the fourth magnet unit 648 are the same as the first magnet unit 642.

Figure 7:
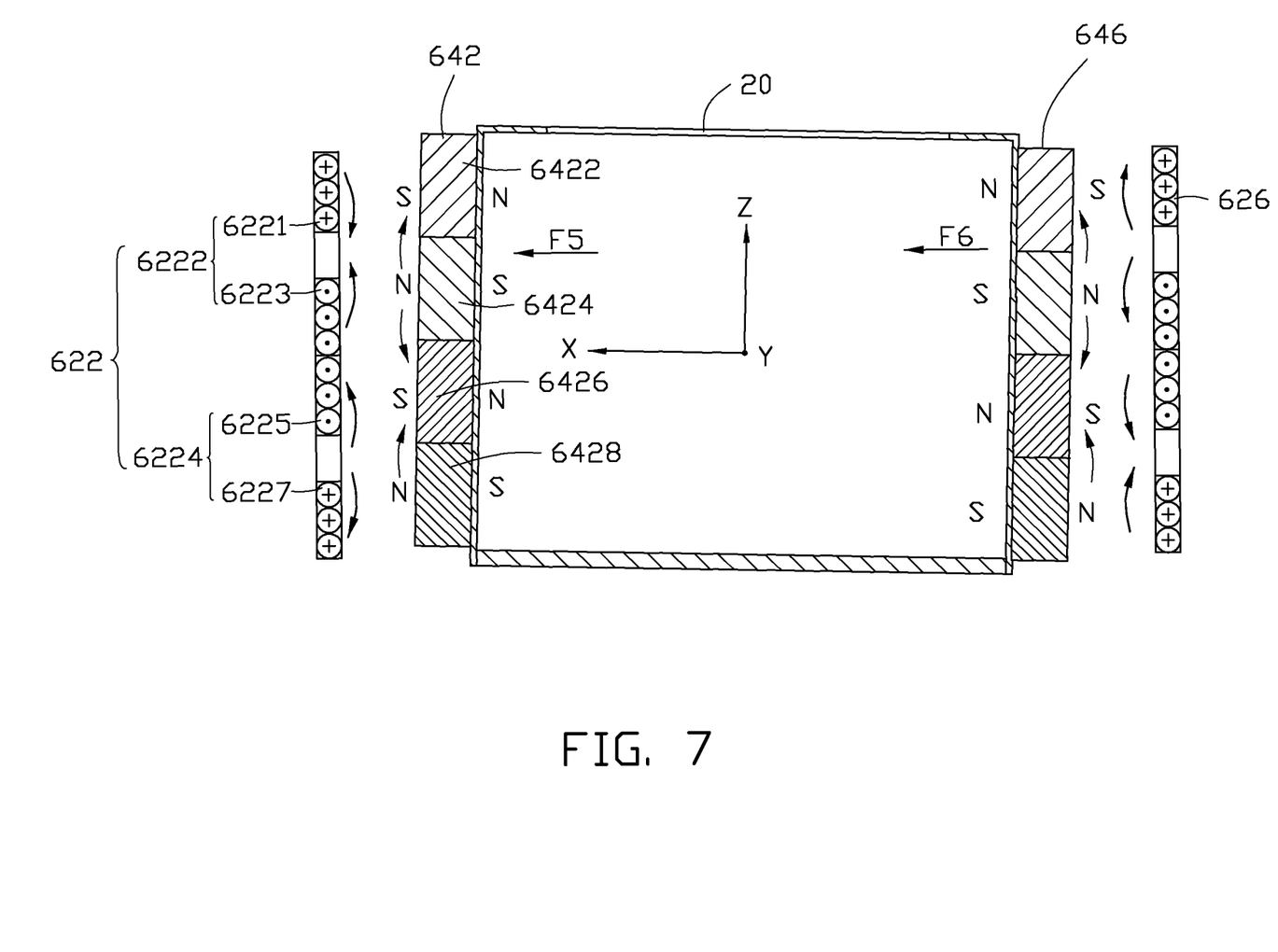
FIG. 7 is a schematic view of a working principle of the actuator of FIG. 6, showing movement of a moveable member along an X axis.

Referring to FIG. 7 together with FIG. 6, when in use, an electrical current is applied to the first coil unit 622 and the third coil unit 626 shown as arrow. The first coil unit 622 and the third coil unit 626 produce magnetic fields. According to Ampere's rule, viewing from the Y axis, the direction of the magnetic induction line generated by the upper side 6221 of the first upper coil 6222 is clockwise. The directions of the magnetic induction line generated by the lower side 6223 of the first upper coil 6222 and the upper side 6225 of the first lower coil 6224 are counterclockwise, and the direction of the magnetic induction line generated by the lower side 6227 of the first lower coil 6227 is clockwise. The direction of the magnetic induction line between the first upper magnet 6422 and the first middle magnet 6424 is clockwise. The direction of the magnetic induction line between the first sub-magnet 6426 and the first middle magnet 6424 is counterclockwise, and the direction of the magnetic induction line between the first sub-magnet 6426 and the first lower magnet 6428 is clockwise. Therefore, an attractive force $F_5$ is produced between the first coil unit 622 and the first magnetic unit 642. According to the same principle as detailed above, a repulsion force $F_6$ is produced between the third coil unit 626 and the third magnetic unit 646. As a result, the moveable member 20 has movement along the positive direction of X axis.

According to the same principle as detailed above, an attractive force is produced between the fourth coil unit 628 and the fourth magnetic unit 648. A repulsion force is produced between the second coil unit 624 and the second magnetic unit 644. As a result, the moveable member 20 has movement along the negative direction of Y axis.

Advantages of the actuator 500 of the second embodiment are similar to those of the actuator 100 of the first embodiment. Further, if the same electrical current is applied to the actuator 500 and the actuator 100, the driving force applied to the actuator 500 is bigger than that of the actuator 100.

Figure 8:
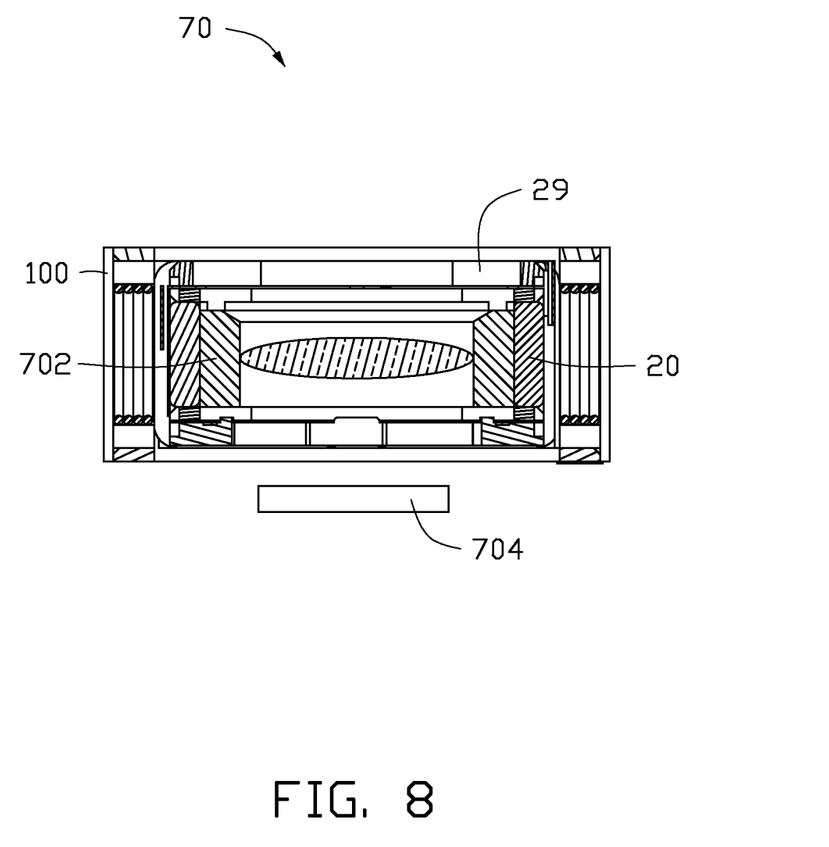
FIG. 8 is a sectional view of an anti-vibration camera module, according to a third exemplary embodiment.

Referring to FIG. 8, an anti-vibration camera module 70, according to a third embodiment, is shown. The anti-vibration camera module 70 includes a lens module 702, an image sensor 704, and the actuator 100 of the first embodiment. The lens module 702 is received in the second receiving room 29 of the moveable member 20. The image sensor 704 is aligned with the lens module 702 and fixed on a base (not shown) outside of the actuator 100. The actuator 100 can drive the lens module 702 to move along X axis or Y axis to compensate for vibration.

It is to be understood that the image sensor 704 may be fixed to the actuator 100, the actuator 100 can drive the image sensor 704 to move along the X axis or the Y axis to compensate for vibration. In other embodiment, the actuator 500 of the second embodiment may be used in the anti-vibration camera module 70.

Advantages of anti-vibration camera module 70 of the third embodiment are similar to those of the above embodiment.

It is to be understood, however, that even though numerous characteristics and advantages of the present embodiments have been set fourth in the foregoing description, together with details of the structures and functions of the embodiments. The disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An actuator, comprising:
a stationary member defining a first receiving room and a central axis, four receiving holes respectively defined in four sides of the stationary member;
a moveable member received in the first receiving room and being apart from the stationary member, the moveable member being coaxial with the stationary member;
a driving member comprising a first magnetic assembly fixedly received in the four receiving holes and a second magnetic assembly fixed to the moveable member, the first magnetic assembly aligning with the second magnetic assembly, the driving member configured for driving the moveable member to move along a first axis and a second axis by magnetic interaction between the first magnetic assembly and the second magnetic assembly, the second axis being perpendicular to the first axis, the first axis and the second axis being perpendicular to the central axis; and
a resilient spring assembly positioned between the stationary member and the moveable member and connecting the moveable member to the stationary member, the spring assembly being deformable when the moveable member moves.

2. The actuator as claimed in claim 1, wherein four receiving grooves are respectively defined in four sides of the moveable member, a second receiving room is defined in the moveable member, the four receiving grooves align with the four receiving holes respectively, and the second magnetic assembly is received in the four receiving grooves.

3. The actuator as claimed in claim 2, wherein the second magnetic assembly comprises four magnet units received in the four receiving grooves, respectively, each magnet unit comprises at least three magnets arranged in line along the central axis, one end of each magnet facing the first magnetic assembly has a magnetic pole, and the magnetic poles of said one ends of the magnets facing the first magnetic assembly are alternately arranged between north magnetic pole and south magnetic pole along the central axis.

4. The actuator as claimed in claim 3, wherein the first magnet assembly comprises four coils received in the four receiving holes, respectively, and each coil comprises an upper side and a lower side opposite to the upper side.

5. The actuator as claimed in claim 4, wherein each magnet unit comprises an upper magnet, a middle magnet, and a lower magnet, the magnetic north of each upper magnet faces the first magnetic assembly, the magnetic south of each middle magnet faces the first magnetic assembly, and the magnetic north of each lower magnet faces the first magnetic assembly.

6. The actuator as claimed in claim 3, wherein the first magnet assembly comprises four coil units received in the four receiving holes, respectively, each coil unit comprises an upper coil and a lower coil arranged in line along the central axis, each coil comprises an upper side and a lower side opposite to the upper side, and a direction of an electrical current applied to the lower side of the upper coil is the same as that applied to the upper side of the lower coil.

7. The actuator as claimed in claim 6, wherein each magnet unit comprises an upper magnet, a middle magnet, a sub-magnet, and a lower magnet, the magnetic south of each upper magnet faces the first magnetic assembly, the magnetic north of each middle magnet faces the first magnetic assembly, the magnetic south of each sub-magnet faces the first magnetic assembly, and the magnetic north of each lower magnet faces the first magnetic assembly.

8. The actuator as claimed in claim 1, wherein the stationary member is an approximately cuboid frame and comprises an upper frame, a lower frame, a first post, a second post, a third post, and a fourth post, the upper frame and the lower frame are positioned at opposite sides of the stationary member, and the four posts connect the upper frame to the lower frame at the respective four corners of the upper frame and the lower frame.

9. The actuator as claimed in claim 8, wherein the four receiving holes comprise a first receiving hole, a second receiving hole, a third receiving hole, and a fourth receiving hole in four sides of the stationary frame, a first protrusion is formed on a side of the first post in the fourth receiving hole, and a second protrusion is formed on a side of the third post in the second receiving hole.

10. The actuator as claimed in claim 9, wherein the moveable member is an approximately cuboid frame and comprises a first frame, a second frame, a first pole, a second pole, a third pole, and a fourth pole, the first frame and the second frame are positioned at opposite sides of the moveable member, and the four poles connect the first frame to the second frame at the respective four corners of the first frame and the second frame.

11. The actuator as claimed in claim 10, wherein the spring assembly comprises a first elastic member and a second elastic member, the first elastic member comprises a first arm and a second arm connected to the first arm, the second elastic member comprises a third arm and a fourth arm connected to the third arm, a distal end of the first elastic member is fixed to the first post, the other distal end of the first elastic member is fixed to the third pole, a distal end of the second elastic member is fixed to the third post, and the other distal end of the second elastic member is fixed to the first pole.

12. The actuator as claimed in claim 11, wherein an included angle between the first arm and the second arm is an obtuse angle, and an included angle between the third arm and the fourth arm is an obtuse angle.

13. The actuator as claimed in claim 11, wherein a first through hole is defined in said distal end of the first elastic member for fixedly receiving the first protrusion, a second through hole is defined in said distal end of the second elastic member for fixedly receiving the second protrusion, the first protrusion extends through the first through hole, and the second protrusion extends through the second through hole.

14. An anti-vibration camera module comprising:
a lens module;
an image sensor; and
an actuator, comprising:
a stationary member defining a first receiving room and a center axis, four receiving holes respectively defined in four sides of the stationary member;
a moveable member received in the first receiving room and being apart from the stationary member, the moveable member being coaxial with the stationary member;
a driving member comprising a first magnetic assembly fixedly received in the four receiving holes and a second magnetic assembly fixed to the moveable member, the first magnetic assembly facing the second magnetic assembly, the driving, member configured for driving the moveable member to move along a first axis and a second axis by magnetic interaction between the first magnetic assembly and the second magnetic assembly, the second axis being perpendicular to the first axis, the first axis and the second axis being perpendicular to the central axis; and
a spring assembly positioned between the stationary member and the moveable member and connecting the moveable member to the stationary member, the spring assembly configured for being deformed when the moveable member moves;
wherein the lens module is received in the moveable member, and the image sensor is aligned with the lens module.

15. The anti-vibration camera module as claimed in claim 14, wherein four receiving grooves are respectively defined in four sides of the moveable member, a second receiving room is defined in the moveable member, the four receiving grooves face the four receiving holes respectively, and the second magnetic assembly is received in the four receiving grooves.

16. The anti-vibration camera module as claimed in claim 15, wherein the second magnetic assembly comprises four magnet units received in the four receiving grooves, respectively, each magnet unit comprises at least three magnets arranged in line along the central axis, one end of each magnet facing the first magnetic assembly has a magnetic pole, and the magnetic poles of said one ends of the magnets facing the first magnetic assembly are alternately arranged between north magnetic pole and south magnetic pole along the central axis.

17. The anti-vibration camera module as claimed in claim 16, wherein the first magnet assembly comprises four coils received in the four receiving holes, respectively, and each coil comprises an upper side and a lower side opposite to the upper side.

18. The anti-vibration camera module as claimed in claim 17, wherein each magnet unit comprises an upper magnet, a middle magnet, and a lower magnet, the magnetic north of each upper magnet faces the first magnetic assembly, the magnetic south of each middle magnet faces the first magnetic assembly, and the magnetic north of each lower magnet faces the first magnetic assembly.

19. The anti-vibration camera module as claimed in claim 14, wherein the stationary member is an approximately cuboid frame and comprises an upper frame, a lower frame, a first post, a second post, a third post, and a fourth post, the upper frame and the lower frame are positioned at opposite sides of the stationary member, the four posts connect the upper frame to the lower frame at the respective four corners of the upper frame and the lower frame, the four receiving holes comprise a first receiving hole, a second receiving hole, a third receiving hole, and a fourth receiving hole in four sides of the stationary frame, a first protrusion is formed on a side of the first post in the fourth receiving hole, and a second protrusion is formed on a side of the third post in the second receiving hole.

20. The anti-vibration camera module as claimed in claim 19, wherein the moveable member is an approximately cuboid frame and comprises a first frame, a second frame, a first pole, a second pole, a third pole, and a fourth pole, the first frame and the second frame are positioned at opposite sides of the moveable member, the four poles connect the first frame to the second frame at the respective four corners of the first frame and the second frame, the spring assembly comprises a first elastic member and a second elastic member, the first elastic member comprises a first arm and a second arm connected to the first arm, the second elastic member comprises a third arm and a fourth arm connected to the third arm, a distal end of the first elastic member is fixed to the first post, the other distal end of the first elastic member is fixed to the third pole, a distal end of the second elastic, member is fixed to the third post, and the other distal end of the second elastic member is fixed to the first pole.

* * * * *